Patented Jan. 24, 1928.

1,657,116

UNITED STATES PATENT OFFICE.

AUGUSTUS H. FISKE, OF WARREN, RHODE ISLAND, ASSIGNOR TO RUMFORD CHEMICAL WORKS, OF PROVIDENCE, RHODE ISLAND, A CORPORATION OF RHODE ISLAND.

BREAD IMPROVER.

No Drawing.   Application filed March 7, 1927.   Serial No. 173,604.

In the commercial production of bread as in large bakeries, the use of a so-called bread improver has been found to be of very great advantage, both in the matter of production efficiency and in the quality of output.

In the Curtner Patent No. 1,524,783, dated February 3, 1925, there was disclosed an invention under which certain gums were provided in a bread improver and such an improver has been found to possess very great and practical advantages. In the use of such an improver I have discovered certain further and additional advantages to be attained, which form the subject matter of my present invention.

Briefly, it may be noted that at certain phases in the bread production there is an increased potential rise in the batch or in the loaf which may be attained and held with such an improver, if the potential elasticity, which is one of the characteristics of this improver, is followed up and taken full advantage of.

While it has been known that the so-called oxidizers, which were usually salts, had a so-called improving effect on the gluten of the bread, it was not understood prior to my invention that vegetable gums were responsive to similar treatment and part of my invention resides in the conception or discovery that the vegetable gum used by the assignee of the Curtner patent in its commercial product could be improved or activated by an acid oxidizing agent to obtain a further advantage in its use.

I do not wish to be bound by any theory, but inasmuch as the results attained by my invention or discovery present certain novel characteristics, I offer by way of possible explanation the following theory which to my mind seems justified by those results.

It has long been recognized in the baking art that there is a tendency in the loaf to slump or fall slightly in the oven from its full initial rise. Efforts have been made to meet this in various ways, by so-called yeast assistants, or other means of increasing the generation of gas at that period. It is obvious, however, that as the higher temperatures penetrate the interior of the loaf the vitality of the yeast must begin to decline and ultimately the yeast is killed in the baking. Such yeast assistants or stimulants must therefore work merely to revive the dying spores at best and as the yeast is most rapidly diminishing in its power at the very time when the loaf needs its fullest sustaining power from within, such method is obviously seriously handicapped as it amounts to a diminishing climax.

It would appear from careful observations, both in laboratory and bakery, that in the operation of my invention there is such a modification of the vegetable gum as to effect a further more complete distribution of the gum through the sponge and dough than has heretofore been possible. This more complete distribution seems to provide for a greater localizing of the gas generated by the leavening agent while it is still in active condition, so that the gas is distributed in a vastly increased number of loci where it is confined by the more widely distributed gum. As the effective ultimate sustaining power of the gas depends upon the area of surface on which it can exert its expansive force, it will be seen that the multiplication of the infinite number of bubbles, if they may be so considered, greatly increases the effectiveness of the gas generated by the yeast in the loaf.

As this gas expands in proportion to the absolute temperature, it will be seen that the sustaining power of the gas in its infinite distribution and confinement is a constantly increasing factor by reason of its confinement and increasing temperature so that up to the time of the setting of the loaf, its sustaining power is constantly increasing in sharp contradistinction to the failure of gas pressure in the ordinary loaf due to the dying of the yeast and the corresponding loss of maintenance of pressure.

This problem will be more fully dealt with hereinafter and my invention more fully explained.

In carrying out my invention I add to the farinaceous base such as the starch or flour, the powdered vegetable gum of the Curtner patent. This gum is known as gum tragacanth and its action on the flour or dough is to supplement and develop with the gluten a more elastic mass whereby to hold the leavening gases. The gum unaided, however, is not sufficient in itself to give a loaf of the maximum size, lightness, and texture, but the potential elasticity of the batch resulting from the use of this gum can be developed and taken full advantage of by the addition of a gum modifying element such as an oxidizing agent, preferably of acid character or in connection with an acid or acid salt.

At this point I may state that the use of harmless oxidizing agents as such has been well known and long recognized in the art, and a variety of oxidizing agents have been disclosed and suggested. Among the older oxidizing agents which have been known and used for a great many years is hydrogen peroxide. Andrews in 1902 indicates the use of such an agent in his Patent No. 693,207. More recently haloid acids and certain oxidizing salts of the haloid group have been proposed. Humphries, in 1908, disclosed in his British Patent No. 13,135, a bread improver which employed for its oxidizing agent certain mineral salts and gave by way of example a salt of potassium, calcium or magnesium. Among the recognized salts of potassium are potassium bromate, potassium iodate and potassium persulphate, the latter being specifically mentioned in the Chitty and Jago British Patent No. 2,778 of 1911. Applicant has worked successfully with potassium nitrate; see his patent of September 14, 1926, No. 1,599,563. The Chitty and Jago patent discussed the use of a salt containing loosely combined oxygen, such as persulphates, perborates or perphosphates and gives by way of example potassium persulphate, sodium perborate or perphosphate. As to the use of the haloid acids, quite a variety of such acids is suggested in the British patent to Tildesley and Watkins, No. 14,931, of 1909, conspicuous among which is mentioned the use of iodic acid, which I prefer for use in my present invention on account of its iodine content. Certain of the ductless glands, notably the thyroid depend on iodine for their secretive function, and where there is a deficiency of iodine, the gland develops a condition commonly known as goitre. Ordinary bread is deficient in iodine, and I not only supply this deficiency by my use of iodic acid, but this acid, moreover, is very effective in its coaction with the powdered vegetable gum, in that it develops to the maximum extent the potential elasticity imparted to the dough by the use of the gum. I therefore preferably use iodic acid as my oxidizing agent and preferably, although not necessarily, I add to the gum tragacanth and iodic acid a small quantity of calcium acid phosphate maintaining the acidity in maturing the dough batch. If desired, I may also add certain nutrient salts, such as calcium and/or ammonium salts to the mixture and a certain amount of sodium chloride.

While acidity has been recognized as necessary to the yeast development the acidity in my improver has a further and additional function. The acid seems to act on the gum to increase its dispersability so that it is more widely distributed and more intimately associated with the gluten of the dough filling between the fibrous structure of the gluten to close the interstices and give to the structure a maximum holding power for the gas which is at once tight and elastic.

Although not confined to exact proportions, I prefer to use a mixture containing approximately .0175% of iodic acid, 3% gum tragacanth and preferably add 5% calcium acid phosphate to every 100 lbs. of the preparation. The remainder of the mix consists or flour, sodium chloride and other commonly known nutrient salts in sufficient quantities to make up the full 100 lbs. The preparation is used in the proportions approximately to 1 lb. of the preparation to each standard 196 lb. barrel of flour.

While I preferably use iodic acid and believe that such an acid has a subtle but definite effect on the gum, either by combination with its base or establishing an equilibrium between the base and the acid elements present, other acids produce this result in greater or less degree. Such acids should, of course, be edible acids and preferably vegetable acids such as tartaric, lactic acid and acid lactates, acetic acid or their acid salts if they have any. I have mentioned already phosphoric acid and its acid salts and I would also point out that the other acids of the halogen group, including hydrochloric, have points of advantage more or less corresponding to the iodic acid which I prefer. All these acids are readily substitutable for the iodic acid on the basis of their equivalent acidity.

While I have referred to my invention on the basis of a bread improver as a commercial product. it will be understood that my invention can be practiced by introducing the ingredients directly into the flour of the batch, in either case my method of improving the bread being the same when considered as a method. My invention therefore, in fact, contemplates a commercial bread and an improved bread as a product. Where prepared as a commercial bread improver or where introduced directly in to the batch, other ingredients may be added as I have specified within the teachings of the art, but as such improvers are not believed to have any relation to the gum and its developed efficiency, I make no further reference to such other ingredients as their effects are only additive for the purposes pointed out, for example, in the patent that I have heretofore cited.

What I therefore claim and desire to secure by Letters Patent is:

1. A new composition of matter for use as a dough assistant consisting of powdered gum tragacanth dispersed in a body of dry farinaceous material, and a small amount of iodic acid.

2. A new composition of matter for use as a dough assistant consisting of powdered gum tragacanth dispersed in a body of dry farinaceous material, and a halogen acidulator.

3. A new composition of matter for use as a dough assistant comprising a dry starchy body, a powdered edible, insoluble vegetable gum of the class described dispersed therein, and a vegetable acidulator.

4. A new composition of matter for use as a dough assistant comprising a dry starchy body, a powdered edible, insoluble vegetable gum of the class described dispersed therein, and an iodine compound of an acid nature.

5. A new product for use as a bread improver, consisting of farinaceous base having distributed therethrough a pulverized vegetable gum, and an acidulator.

6. In the making of yeast-leavened bread, that step which consists in adding to the batch a pulverized vegetable gum and an acidulator.

7. A bread made from a flour mixture having a pulverized vegetable gum and an acidulator distributed therethrough in gluten-strengthening and developing relation thereto.

8. A bread made from a flour mixture having a pulverized vegetable gum and a small amount of iodic acid distributed therethrough in gluten strengthening and developing relation thereto.

In testimony whereof I affix my signature.

AUGUSTUS H. FISKE.